US010420052B2

(12) United States Patent
Sun et al.

(10) Patent No.: US 10,420,052 B2
(45) Date of Patent: Sep. 17, 2019

(54) ESTIMATING FREQUENCY ERROR WITH BEACON TRANSMISSIONS

(71) Applicant: QUALCOMM Incorporated, San Diego, CA (US)

(72) Inventors: Jing Sun, San Diego, CA (US); Xiaoxia Zhang, San Diego, CA (US); Taesang Yoo, Riverside, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 15/402,647

(22) Filed: Jan. 10, 2017

(65) Prior Publication Data
US 2017/0251446 A1  Aug. 31, 2017

Related U.S. Application Data

(60) Provisional application No. 62/299,814, filed on Feb. 25, 2016.

(51) Int. Cl.
H04W 56/00  (2009.01)
(52) U.S. Cl.
CPC .............. H04W 56/0035 (2013.01)
(58) Field of Classification Search
CPC ........ H04B 1/10; H04B 1/713; H04B 17/212; H04J 1/00; H04J 3/06; H04J 3/24;
(Continued)

(56) References Cited

U.S. PATENT DOCUMENTS 7,746,760 B2  6/2010 Vijayan et al.
9,065,717 B2  6/2015 Umeda et al.
(Continued)

FOREIGN PATENT DOCUMENTS

EP  2453710 B1  10/2013
EP  2104293 B8  5/2016

OTHER PUBLICATIONS

<Span style="font-family: calibri;">Morelli M., et al., "A Robust Maximum Likelihood Scheme for PSS Detection and Integer Frequency Offset Recovery in LTE Systems", IEEE Transactions on Wireless Communications, vol. 15, No. 2, Feb. 2016, pp. 1353-1363.

Primary Examiner — Shawkat M Ali
(74) Attorney, Agent, or Firm — Norton Rose Fulbright US LLP

(57) ABSTRACT

Estimation of frequency error is disclosed through use of beacon or preamble transmissions. A base station transmits one or more preamble tones at predetermined frequencies using all allocated transmission power associated with the transmission bandwidth for the one or more preamble tones. The base station then transmits its synchronization signals. A UE collects a set of samples from the received transmissions waveform and successively transforms the samples to a frequency domain. The UE may then detect the preamble tones as having at least a threshold power relative to other samples in the transformed samples. The frequency error may then be set as the difference between the detected frequency or frequencies of the received preamble tones and the known predetermined transmission frequency.

10 Claims, 9 Drawing Sheets

(58) Field of Classification Search
CPC .......... H04J 11/00; H04J 1/0036; H04K 1/10;
H04L 12/26; H04L 25/02; H04L 25/0204;
H04L 27/00; H04L 27/06; H04L 27/26;
H04L 27/28; H04L 27/2657; H04L
27/2695; H04W 24/00; H04W 48/16;
H04W 56/00; H04W 56/0035
USPC ........ 370/206, 210, 252, 343, 503; 375/132,
375/224, 226, 229, 260, 316, 341, 346;
455/150.1
See application file for complete search history.

(56) References Cited

U.S. PATENT DOCUMENTS

| | | | |
|---|---|---|---|
| 9,231,811 B2* | 1/2016 | Mochizuki .......... | H04L 27/2695 |
| 2007/0036231 A1* | 2/2007 | Ido ...................... | H04L 25/0222 |
| | | | 375/260 |
| 2010/0008346 A1* | 1/2010 | Shirakata ............ | H04L 25/0228 |
| | | | 370/343 |
| 2011/0164671 A1* | 7/2011 | Matsumura ......... | H04L 27/2659 |
| | | | 375/229 |
| 2012/0170480 A1* | 7/2012 | Ido ........................ | G01S 11/02 |
| | | | 370/252 |
| 2013/0114659 A1* | 5/2013 | Murakami .......... | H04L 27/2691 |
| | | | 375/224 |
| 2014/0294128 A1* | 10/2014 | Umeda ............... | H04L 27/2657 |
| | | | 375/346 |

* cited by examiner

ESTIMATING FREQUENCY ERROR WITH BEACON TRANSMISSIONS

CROSS-REFERENCE TO RELATED APPLICATIONS

This application claims the benefit of U.S. Provisional Patent Application No. 62/299,814, entitled, "ESTIMATING FREQUENCY ERROR WITH BEACON TRANSMISSIONS," filed on Feb. 25, 2016, Which is expressly incorporated by reference herein in its entirety.

BACKGROUND

Field

Aspects of the present disclosure relate generally to wireless communication systems, and more particularly, to estimating frequency error in discovery reference signals (DRS) using beacon transmissions.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes collecting a set of samples from a received transmission waveform, successively transforming the set of samples to a frequency domain resulting in a transformed set of samples, detecting one or more tones having at least a threshold power relative to other samples in the transformed set of samples, comparing a frequency of the one or more tones to a predetermined transmission frequency, and setting a frequency error to a difference between the frequency and the predetermined transmission frequency.

In another aspect of the disclosure, a method of wireless communication includes transmitting one or more preamble tones at corresponding one or more predetermined frequencies, wherein the one or more preamble tones are transmitted with all allocated transmission power associated with a transmission bandwidth, and transmitting a synchronization signal after the one or more preamble tones, wherein the synchronization signal is transmitted with a transmission power equal to a preamble transmission power of the one or more preamble tones.

In a further aspect of the disclosure, an apparatus configured for wireless communication includes means for collecting a set of samples from a received transmission waveform, means for successively transforming the set of samples to a frequency domain resulting in a transformed set of samples, means for detecting one or more tones having at least a threshold power relative to other samples in the transformed set of samples, means for comparing a frequency of the one or more tones to a predetermined transmission frequency, and means for setting a frequency error to a difference between the frequency and the predetermined transmission frequency.

In a further aspect of the disclosure, an apparatus configured for wireless communication includes means for transmitting one or more preamble tones at corresponding one or more predetermined frequencies, wherein the one or more preamble tones are transmitted with all allocated transmission power associated with a transmission bandwidth, and means for transmitting a synchronization signal after the one or more preamble tones, wherein the synchronization signal is transmitted with a transmission power equal to a preamble transmission power of the one or more preamble tones.

In an additional aspect of the disclosure, a non-transitory computer-readable medium having program code recorded thereon. The program code further includes code to collect a set of samples from a received transmission waveform, code to successively transform the set of samples to a frequency domain resulting in a transformed set of samples, code to detect one or more tones having at least a threshold power relative to other samples in the transformed set of samples, code to compare a frequency of the one or more tones to a predetermined transmission frequency, and code to set a frequency error to a difference between the frequency and the predetermined transmission frequency.

In an additional aspect of the disclosure, a non-transitory computer-readable medium having program code recorded thereon. The program code further includes code to transmit one or more preamble tones at corresponding one or more predetermined frequencies, wherein the one or more preamble tones are transmitted with all allocated transmission power associated with a transmission bandwidth, and code to transmit a synchronization signal after the one or more preamble tones, wherein the synchronization signal is transmitted with a transmission power equal to a preamble transmission power of the one or more preamble tones.

In an additional aspect of the disclosure, an apparatus configured for wireless communication is disclosed. The apparatus includes at least one processor, and a memory coupled to the processor. The processor is configured to collect a set of samples from a received transmission waveform, to successively transform the set of samples to a frequency domain resulting in a transformed set of samples, to detect one or more tones having at least a threshold power relative to other samples in the transformed set of samples, to compare a frequency of the one or more tones to a predetermined transmission frequency, and to set a frequency error to a difference between the frequency and the predetermined transmission frequency.

In an additional aspect of the disclosure, an apparatus configured for wireless communication is disclosed. The apparatus includes at least one processor, and a memory coupled to the processor. The processor is configured to transmit one or more preamble tones at corresponding one or more predetermined frequencies, wherein the one or more preamble tones are transmitted with all allocated transmission power associated with a transmission bandwidth, and to transmit a synchronization signal after the one or more preamble tones, wherein the synchronization signal is transmitted with a transmission power equal to a preamble transmission power of the one or more preamble tones.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
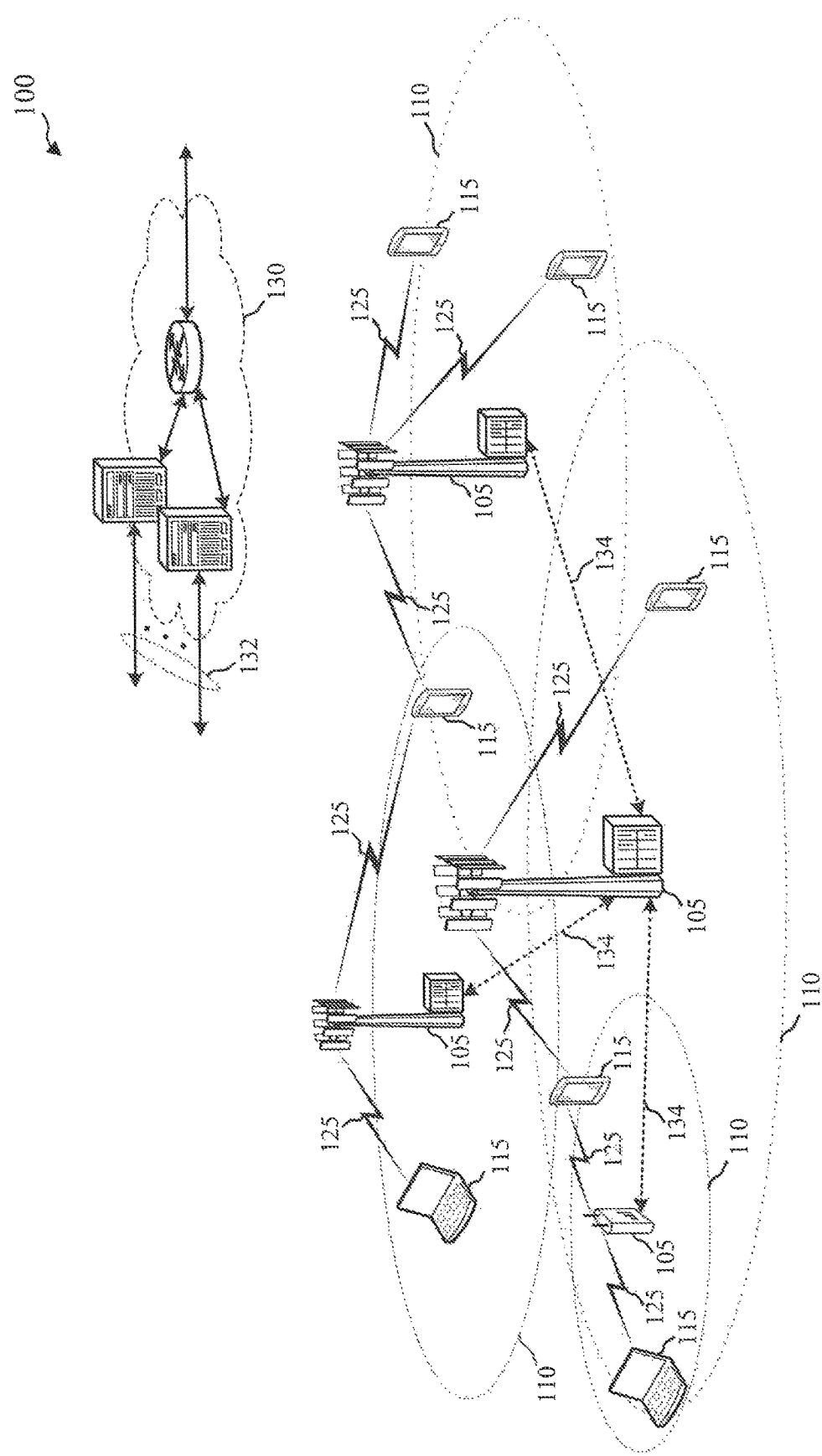
FIG. 1 is a block diagram conceptually illustrating an example of a mobile communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A including an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A with unlicensed spectrum deployment (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A networks without unlicensed spectrum and LTE/LTE-A networks with unlicensed spectrum for a given SP. An LTE/LTE-A network with unlicensed spectrum may provide unicast and/or multicast services according to the needs of the SP. Moreover, an LTE/LTE-A network with unlicensed spectrum may operate in a bootstrapped mode (also known as licensed-assisted access (LAA) mode) in which LTE cells act as anchor and provide relevant cell information (e.g., radio frame timing, common channel configuration, system frame number or SFN, etc.) for LTE/LTE-A cells with unlicensed spectrum. In this mode, there may be close interworking between LTE/LTE-A without unlicensed spectrum and LTE/LTE-A with unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LEA-A network with unlicensed spectrum operates independently from an LTE network without unlicensed spectrum. In this case, there may be a loose interworking between LTE without unlicensed spectrum and LTE/LTE-A with unlicensed spectrum based on RLC-level aggregation with co-located. LTE/LTE-A with/without unlicensed spectrum cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

As described above, the typical service provider that may benefit from the capacity offload offered by using LTE/LTE-A with unlicensed spectrum is a traditional mobile network operator (MNO) with LTE spectrum. An MNO is a provider of wireless communication services that owns or controls all the elements necessary to sell and deliver services to an end user. For these service providers, an operational configuration may include a bootstrapped mode (e.g., supplemental downlink, carrier aggregation) that uses the LTE primary component carrier ("PCC" or "PCell") on the licensed spectrum and the LTE secondary component carrier ("SCC" "SCell") on the unlicensed spectrum.

Figure 2:
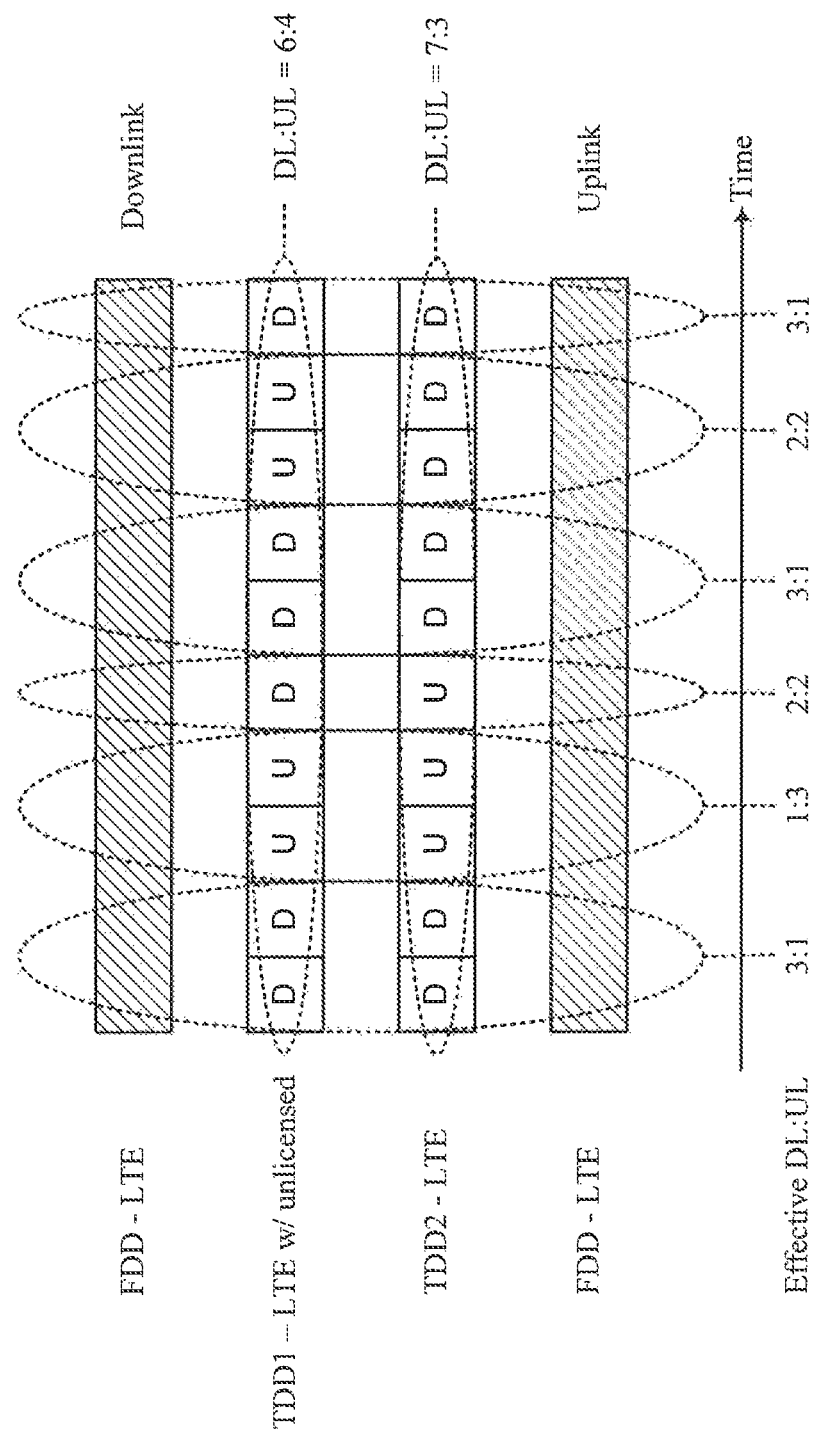
FIG. 2 shows a diagram that illustrates an example of carrier aggregation when using LTE concurrently in licensed and unlicensed spectrum according to various embodiments.

Turning next to FIG. 2, a diagram 200 illustrates an example of carrier aggregation when using LTE concurrently in licensed and unlicensed spectrum according to various embodiments. The carrier aggregation scheme in diagram 200 may correspond to the hybrid FDD-TDD carrier aggregation. This type of carrier aggregation may be used in at least portions of the system 100 of FIG. 1. Moreover, this type of carrier aggregation may be used in the base stations 105 of FIG. 1, respectively, and/or in the UEs 115 of FIG. 1.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE with licensed spectrum, and another FDD (FDD-LTE) may be performed in connection with LTE in the uplink with licensed spectrum. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with or without unlicensed spectrum.

Figure 3:
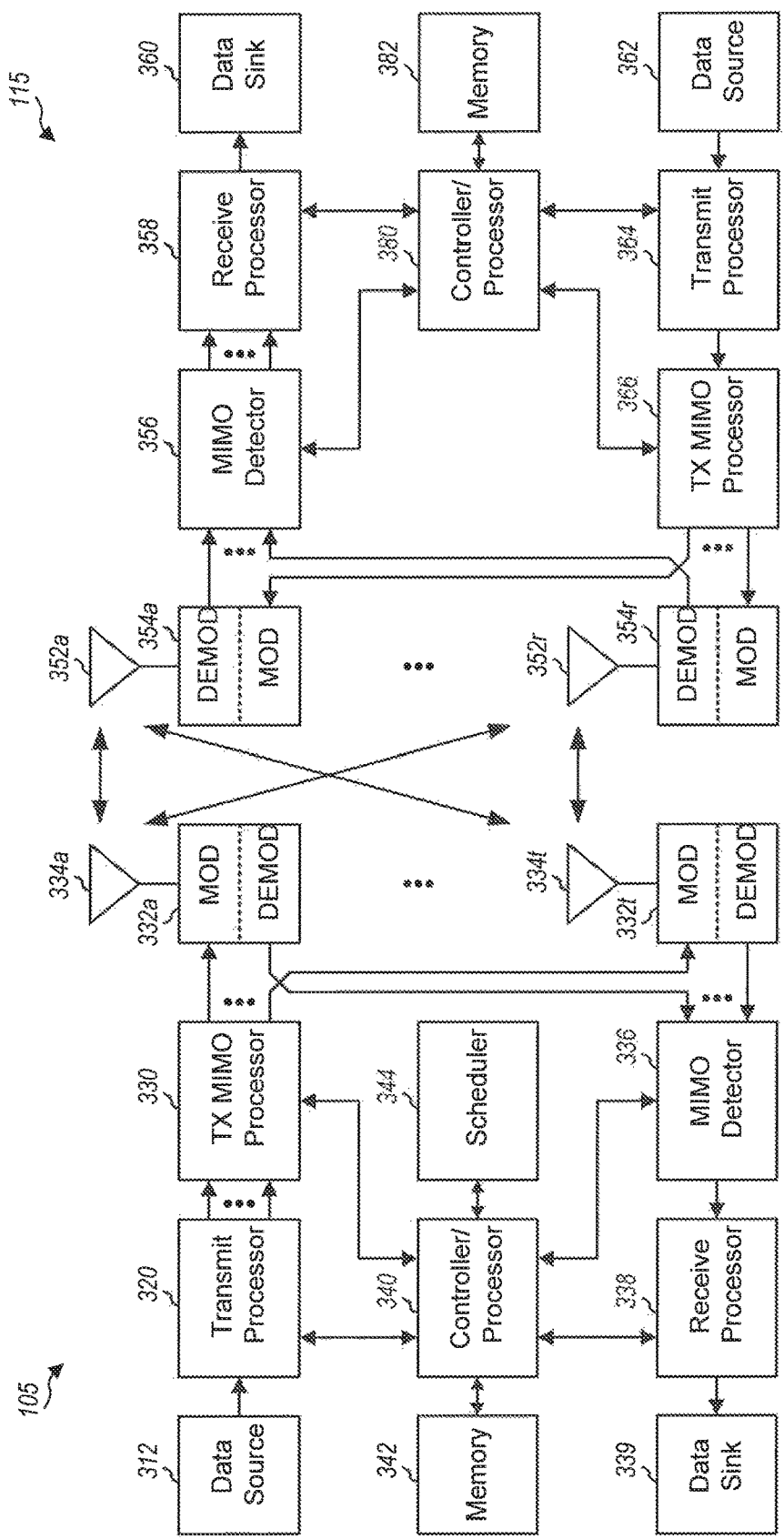
FIG. 3 is a block diagram conceptually illustrating a design of a base station/eNB and a UE configured according to one aspect of the present disclosure.

FIG. 3 shows a block diagram of a design of a base station/eNB 105 and a UE 115, which may be one of the base stations/eNBs and one of the UEs in FIG. 1. The eNB 105 may be equipped with antennas 334a through 334t, and the UE 115 may be equipped with antennas 352a through 352r. At the eNB 105, a transmit processor 320 may receive data from a data source 312 and control information from a controller/processor 340. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 320 may process (e.g., encode and symbol map) the data and control information to obtain data symbols and control symbols, respectively. The transmit processor 320 may also generate reference symbols, e.g., for the primary synchronization signal (PSS), secondary synchronization signal (SSS), and cell-specific reference signal.

A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODS) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 115, the antennas 352a through 352r may receive the downlink signals from the eNB 105 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 115 to a data sink 360, and provide decoded control information to a controller/processor 380.

On the uplink, at the UE 115, a transmit processor 364 may receive and process data (e.g., for the physical uplink shared channel (PUSCH)) from a data source 362 and control information (e.g., for the physical uplink control Channel (PUCCH)) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc,), and transmitted to the eNB 105. At the eNB 105, the uplink signals from the UE 115 may be received by the antennas 334, processed by the modulators 332, detected by a MIMO detector 336 if applicable, and further processed by a receive processor 338 to obtain decoded data and control information sent by the UE 115. The processor 338 may provide the decoded data to a data sink 339 and the decoded control information to the controller/processor 340.

The controllers/processors 340 and 380 may direct the operation at the eNB 105 and the UE 115, respectively. The controller/processor 340 and/or other processors and modules at the eNB 105 may perform or direct the execution of various processes for the techniques described herein. The controllers/processor 380 and/or other processors and modules at the UE 115 may also perform or direct the execution of the functional blocks illustrated in FIG. 6, and/or other processes for the techniques described herein. The memories 342 and 382 may store data and program codes for the eNB 105 and the UE 115, respectively. A scheduler 344 may schedule UEs for data transmission on the downlink and/or uplink.

With advancing technologies and access for various radio access networks using both licensed and unlicensed spectrum, it may be advantageous to provide enhancements to existing carrier configurations in order to achieve lower latency and more flexibility in bandwidth. An enhanced component carrier (eCC) is defined for use in secondary cell (SCell) or secondary component carrier (SCC) implementations. Use of such eCC may be provided for radio resource control (RRC) connected UEs, such that eCCs operations may be used in data transmissions, but not for UEs to camp on. The numerology defined for eCCs may support shorter transmission time intervals (TTIs) in order to decrease latency. For example, eCC numerology may support TTI lengths of a single symbol or symbol period. Thus, the eCC numerology does not overlap with existing legacy numerologies and would not support multiplexing with the legacy numerologies.

Applicable to both unlicensed and licensed spectrum, the design principles for eCC operations to address include wide bandwidth (e.g., 60 MHz, 80 MHz, 100 MHz, etc.) spectrum sharing, and low latency, which can be achieved using the new numerology with a shortened orthogonal frequency division multiplex (OFDM) symbol duration, shorter TTI, a fast ACK/NAK turn-around, and dynamic switching between downlink and uplink, and different UEs, based on the traffic. Therefore, the systems with eCC operation may adapt based on the needs of the traffic load.

With traffic that can support a larger latency, benefits in efficiency may be achieved through better scheduling decisions, more complex coding or decoding, and the like. However, with small amounts of data that cannot support larger latencies, implementing a very fast response time may sacrifice efficiency, while support the more latency-sensitive data. Thus, a trade-off exists between efficiency and latency.

The frame structure for eCC may be based on a TDD frame structure that includes designated downlink and uplink symbols to enable radio resource management (RRM) measurements, synchronization, channel state information (CSI) feedback, random access channel (RACH), scheduling request (SR), and the like. Such downlink and update designations may be configured by RRC signaling. Dynamic switching between downlink and uplink symbols may also be determined by the dynamic grant. Thus, there would be no need to look-ahead in terms of the number of downlink and uplink subframes for the entire radio frame. This dynamic frame structure would be more dynamic/flexible than the current LTE system.

Figure 4:
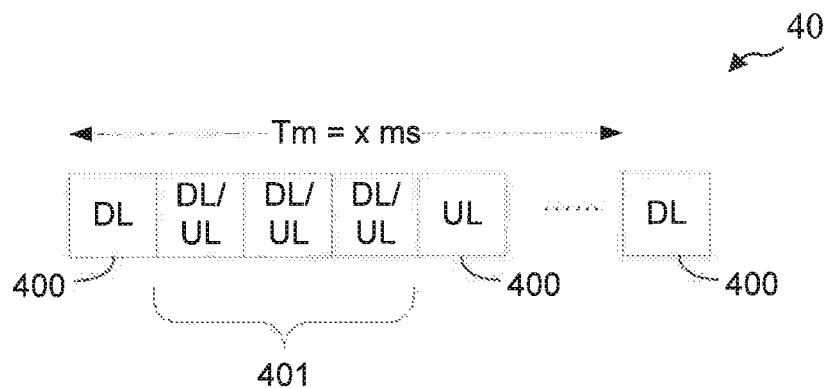
FIG. 4 is a block diagram illustrating an enhanced component carrier (eCC) transmission stream.

FIG. 4 is a block diagram illustrating eCC transmission stream 40. In TDD transmission, eCC transmission stream 40 is divided into multiple subframes each having an assigned directional allocation, such as uplink or downlink. In eCC transmission stream 40, certain subframes 400 are directionally fixed in either an uplink or downlink configuration, while other subframes 401 are dynamic subframes that may be dynamically changed by the base station to uplink or downlink as the traffic load dictates.

It should be noted that when dynamically switching between downlink and uplink subframes, guard symbols may be defined, such that the first symbol of an uplink subframe immediately following a downlink subframe may be configured as a guard symbol, in which the UE will not expect to transmit uplink data.

eCC operation may be useful when operating in higher carrier frequencies with decreased symbol time. This may also enable very short latencies. The various aspects of the present disclosure provide for discontinuous reception (DRX), semi-persistent scheduling (SPS), and activation/deactivation procedures for an eCC secondary cell (SCell).

In LTE/LTE-A networks configured for aggregated communications using both contention and non-contention-based spectrum, the contention-based spectrum may operate in frequencies shared with other radio technologies, such as WIFI. When leveraging WIFI spectrum for such contention-based communications, the radios for such contention-based communication may include WIFI radios used in various WIFI nodes or devices. The operator requirements for WIFI nodes are not as strict as in more regulated radio access technologies, such as non-contention-based LTE and LTE-A networks. For example, WIFI operator requirements provide for local oscillators in WIFI nodes to have a targeted frequency variation of ±20 parts per million (ppm). In contrast, the operator requirements for local oscillators in LTE nodes provide for targeted frequency variation of only about ±0.5 ppm. Thus, the tolerances built into WIFI nodes that may be used for contention-based communications are much less accurate than the nodes used for the non-contention based portion of the communications.

When operating at the 5 GHz band, a frequency variation of ±20 ppm results in a potential frequency error of ±100 KHz for each node. Therefore, between both the UE and eNB, the total potential frequency difference results in up to ±200 KHz. PSS/SSS detection is provided for only up to a frequency error of ±8 KHz. Thus, PSS/SSS detection may cover only an area or bin of 16 KHz. Considering a ±200 KHz potential frequency error range, it would take 25 16 KHz bins to cover the entire 400 KHz. range. Therefore, the computational complexity would be high for resolving PSS/SSS detection for a typical WIFI node having a ±20 ppm frequency variation.

Various aspects of the present disclosure are directed to using a supporting (additional) waveform to assist the UE to estimate the frequency error first, before moving to the PSS/SSS detection step. Additional aspects of the additional waveform may also provide timing information in order to reduce the number of timing hypotheses run for PSS/SSS detection. Thus, by adding load to the air interface a trade-off in reduction of receiver complexity may be achieved.

In order for such an additional waveform to be useful for purposes of assisting the UE, it may be capable of providing frequency error information and should be detectable without requiring timing information or high computational complexity. Moreover, because of the lower local oscillator operator requirements, the additional waveform should be capable of handling up to a ±200 KHz frequency error, satisfy the unlicensed band emission requirement of a maximum 10 dBm within 1 MHz. Such an additional waveform may be processed by the searcher branch of a given UE. Therefore, it is preferred to design the additional waveform to be within 1 MHz maximum bandwidth to fit into the same searcher hardware branch handles the PSS/SSS detection The additional waveform would not need to provide any eNB identification information, as that information would be provided in the PSS/SSS detection stage.

Figure 5:
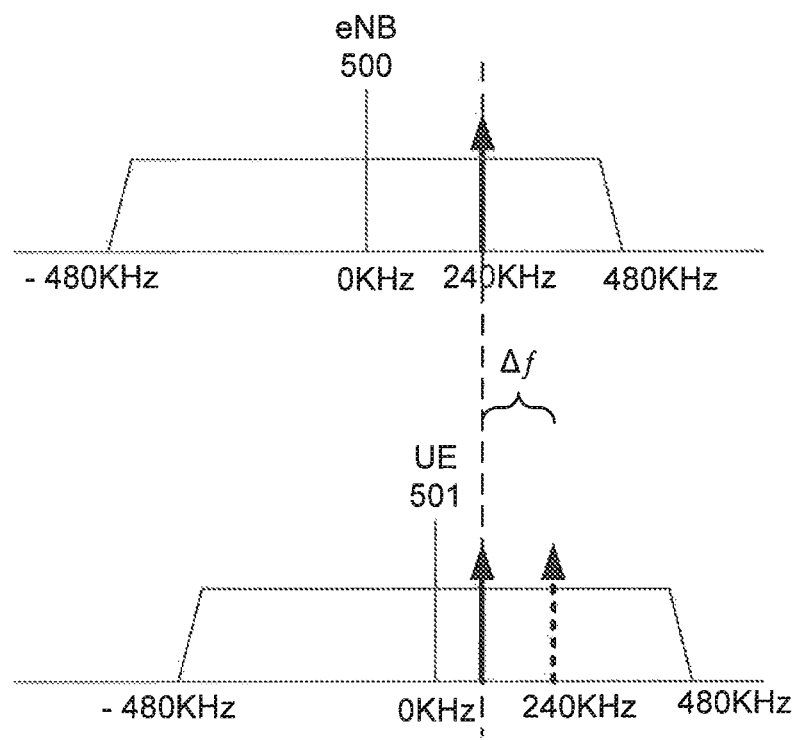
FIG. 5 is a block diagram illustrating frequency plots for communications between an eNB and UE configured according to one aspect of the present disclosure.

FIG. 5 is a block diagram illustrating frequency plots for communications between an eNB 500 and UE 501 configured according to one aspect of the present disclosure. One example aspect of the present disclosure provides for transmission of a single tone as a preamble before transmitting PSS/SSS, in the example implementation illustrated in FIG. 5, a 15 KHz tone is transmitted at an offset of 240 KHz (or −240 KHz). In alternative implementations of the various aspects, one or more tones may be selected at different frequencies and different offsets. The aspects of the present disclosure are not limited to one set of parameters for the one or more tones. The 240 KHz offset is selected such that, even with up to a frequency error of ±200 KHz, the tone would still be located away from the direct current (DC) tone. Accordingly, the tone would fail within an interval of 40 KHz to 440 KHz.

In the example aspect illustrated in FIG. 5, eNB 500 transmits the single 15 KHz tone using all of the 10 dBm transmit power in the single tone. As a result of transmitting full power in the single tone, the preamble tone would result in approximately an 18 dB power gain over PSS/SSS tones. eNB 500 may transmit the single tone over one or two OFDM symbols. While transmission over two OFDM symbols would result in more overhead to manage the tone, it can provide more frequency error resolution. Moreover, while more than one tone may be transmitted, because one of the goals of the tone is to be easily detected, a limited number or single tone waveform over which to place the full 10 dBm transmit power may result in easier detection over PSS/SSS tones. With a single tone aspect, the center frequency can be directly read from the peak identified after transforming the signal into the frequency domain, such as by applying a fast Fourier transform (FFT), discrete Fourier transform (DFT), and the like. The resulting distance between the measured frequency at UE 501 and the known offset will be the determined frequency error (Δf). The frequency transform would not require timing information as long as the transform range would fall within the preamble transmission.

Figure 6:
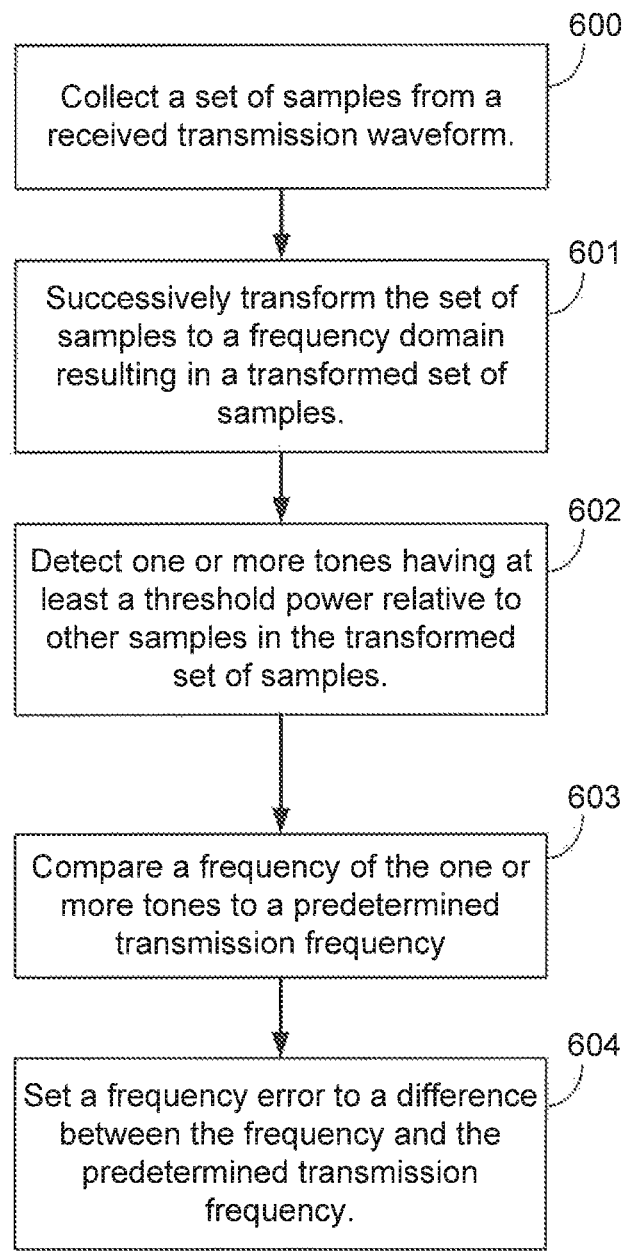
FIG. 6 is a block diagram illustrating example blocks executed to implement one aspect of the present disclosure.
Figure 9:
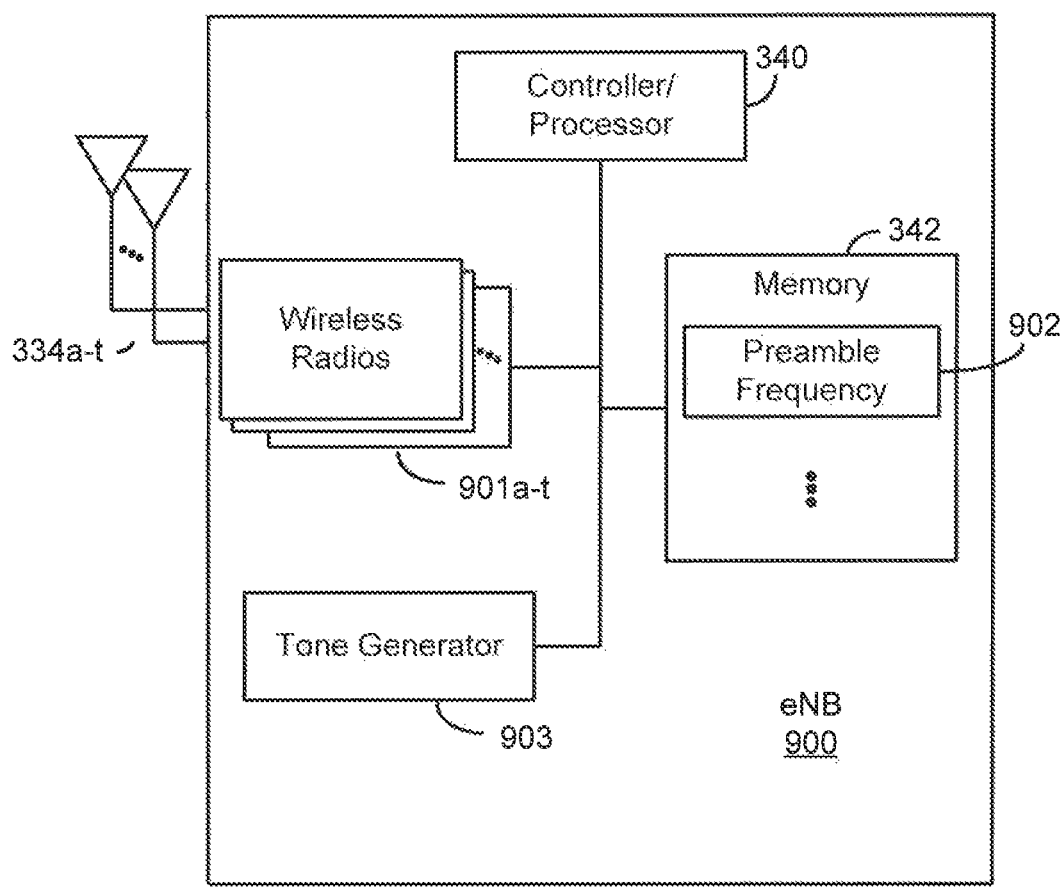
FIGS. 9 and 10 are block diagrams illustrating an eNB and UE configured according to aspects of the present disclosure.
Figure 10:
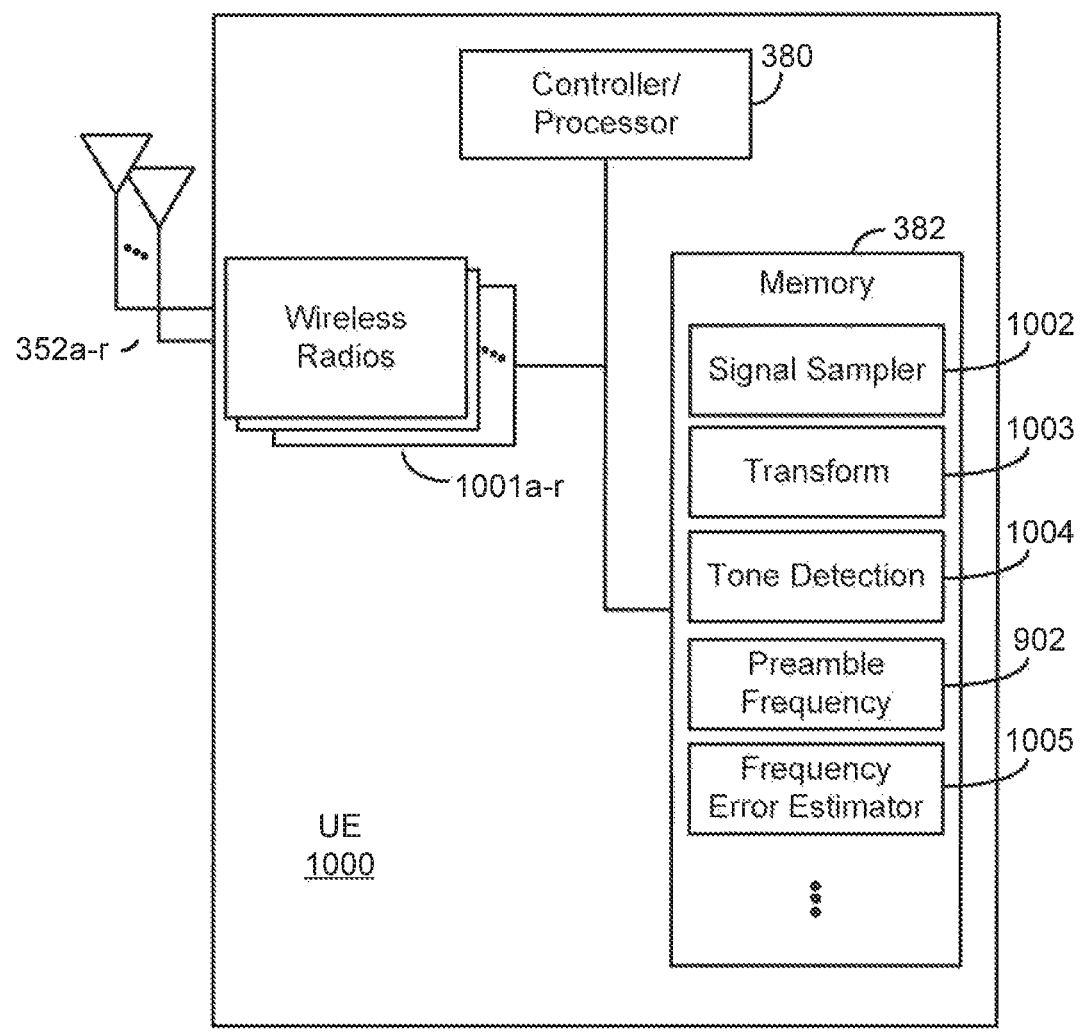

FIG. 6 is a block diagram illustrating example blocks executed to implement one aspect of the present disclosure. The example blocks and actions described with respect to FIG. 6 will also be described with respect to the structure, hardware, and components of eNB 900 and UE 1000, as illustrated in FIGS. 9 and 10, respectively. FIGS. 9 and 10 are block diagrams illustrating an eNB 900 and LTE 1000 configured according to aspects of the present disclosure, eNB 900 and UE 1000 include the structure, hardware, and components as illustrated for eNB 105 and UE 115, respectively, of FIG. 3. For example, eNB 900 includes controller/processor 340, which operates to execute logic or computer instructions stored in memory 342, as well as controlling the components of eNB 900 that provide the features and functionality of eNB 900. Similarly, UE 1000 includes controller/processor 380, which operates to execute logic or computer instructions stored in memory 382, as well as controlling the components of UE 1000 that provide the features and functionality of UE 1000.

At block 600, a UE, such as UE 1000, collects a set of samples from a transmission waveform received from an eNB, such as eNB 900. eNB 900, under controller/processor 340, accesses preamble frequency 902 stored in memory 342 and controls tone generator 903 to generate a preamble tone at preamble frequency 902. The preamble tone may then be transmitted via wireless radios 901a-t and antennas 334a-t. Wireless radios 901a-t may include the hardware and components illustrated in FIG. 3, such as transmit processor 320, TX MIMO processor 330, modulator/demodulators 332a-t, MIMO detector 336, and receive processor 338. UE 1000 receives the transmission wave form from eNB 900 via antennas 352a-r and wireless radios 1001a-r, under control of controller/processor 380. Wireless radios 1001a-r may include the hardware and components illustrated in FIG. 3, such as transmit processor 364, TX MIMO processor 366, demodulator/modulators 354a-r, MIMO detector 356, and receive processor 358.

To process received waveform, UE 1000, under control of controller/processor 380, executes signal sampler logic 1002 stored in memory 382 to sample the waveform at particular sample rate. An input signal may be sampled at a chip rate (also referred to as "chip ×" or "cx"), or at a multiple of a chip rate. A chip is generally a length of time based on the system transmission bandwidth (e.g., an inverse of the system transmission bandwidth). A sample rate of cx1 (also referred to as "chip ×1") is one times the chip rate, meaning that UE 1000 would take one sample of the input signal (e.g., the transmission waveform) during each chip. A sample rate of c×2 is two times the chip rate, meaning that UE 1000 would take two samples of the input signal during each chip. In one example implementation of the presently described aspect, UE 1000 may collects c×2 samples at an example sampling rate of 1.92 MHz. It should be noted that additional example implementations may use a different sample rate.

At block 601, the UE successively transforms the set of samples to a frequency domain resulting in a transformed set of samples. In one example implementation, UE 1000 executes, under control of controller/processor 380, transform logic 1003 stored in memory 382 and performs successive or back-to-back FFT of the set of samples for half of the length of single tone waveform. In order to cover PSS/SSS under consideration of a maximum frequency error of ±200 KHz, UE 1000 may filter the samples at a filter bandwidth of 1480 KHz (1080+200×2=1480 KHz). When sampling at a c×2 rate, there would be 128 samples within a single OFDM symbol. As the one or more tones may be transmitted over either one or two OFDM symbols, in example implementations using a c×2 sampling rate and FFT as the frequency transform, the FFT window size may be set to 64 samples (half of the total number of available samples for the symbol) when transmitted over one OFDM symbol, or 128 samples when transmitted over two OFDM symbols. As a result, one of the successive FFT will use samples completely within the tone transmission period.

At block 602, the UE detects one or more tones having at least a threshold power relative to other samples in the transformed set of samples. UE 1000, under control of controller/processor 380, executes tone detection logic 1004 stored in memory 382 to detect the relative threshold power of the one or more tones relative to the other transformed samples. In one example implementation, in which a single tone is transmitted, the UE attempts to identify a pattern of a single high power tone in the range of 40 KHz to 440 KHz. A metric may be computed as a part of the execution environment of the executing tone detection logic 1004 as the ratio of the tone power over total power which may then be compared with a threshold, included in tone detection logic 1004, in order to lessen the trade-off between for miss detection and false alarm.

At block 603, the UE compares the frequency of the detected one or more tones to a predetermined transmission frequency. For example, UE 1000, under control of controller/processor 380, executes frequency error estimator logic 1005 stored in memory 382 to compare the detected frequency to the predetermined transmission frequency stored in memory 382 at preamble frequency 902. The predetermined transmission frequency reflects the frequency at which the one or more tones is expected from eNB 900. For example, in the example implementation in which a single tone is transmitted at 240 KHz, the predetermined transmission frequency is 240 KHz stored at preamble frequency 902. The detected frequency is compared against this known expected frequency. When a single tone is transmitted, the center frequency of the detected tone is compared with the predetermined transmission frequency to estimate frequency error. When more than one tone is transmitted, for example two tones at offsets x and y, the relative location between the known and detected offsets are compared. Thus, with detected tones at x' and y', a first check would be to determine if y'−x' is close to y−x. If the compared differences of the detected and predetermined tones is far off, this would mean that the two detected tones are actually not the preamble tones. Accordingly, this would be an additional rule to protect against false alarms. When y'−x' is close to y−x, then a successful detection of the frequency tones may be declared. With successful detection with more than one preamble tone, the frequency error would be calculated as the average of y'−y and x'−x. If three tones are used, then similar operation may be implemented with predetermined frequencies x, y, and z, and detected tones x', y', and z'. Because there is benefit to transmitting the preamble tones at a high enough total power so that the disparity between power level compared to the power level of the PSS/SSS is large enough to easily detect and distinguish the preamble tones from any other signals, it may be beneficial to limit aspects that use multiple tone preambles to using a limited number of tones, such as two or three.

At block 604, the UE sets the frequency error to the difference between the frequency and the predetermined transmission frequency. Once the difference between the detected frequency and the predetermined transmission frequency is determined, UE 1000 will set that difference as the frequency error for further PSS/SSS detection.

In various aspects of the present disclosure, once set, the UE may use the frequency error to phase ramp the samples after the FFT and perform PSS/SSS detection over that phase ramped interval.

Figure 7A:
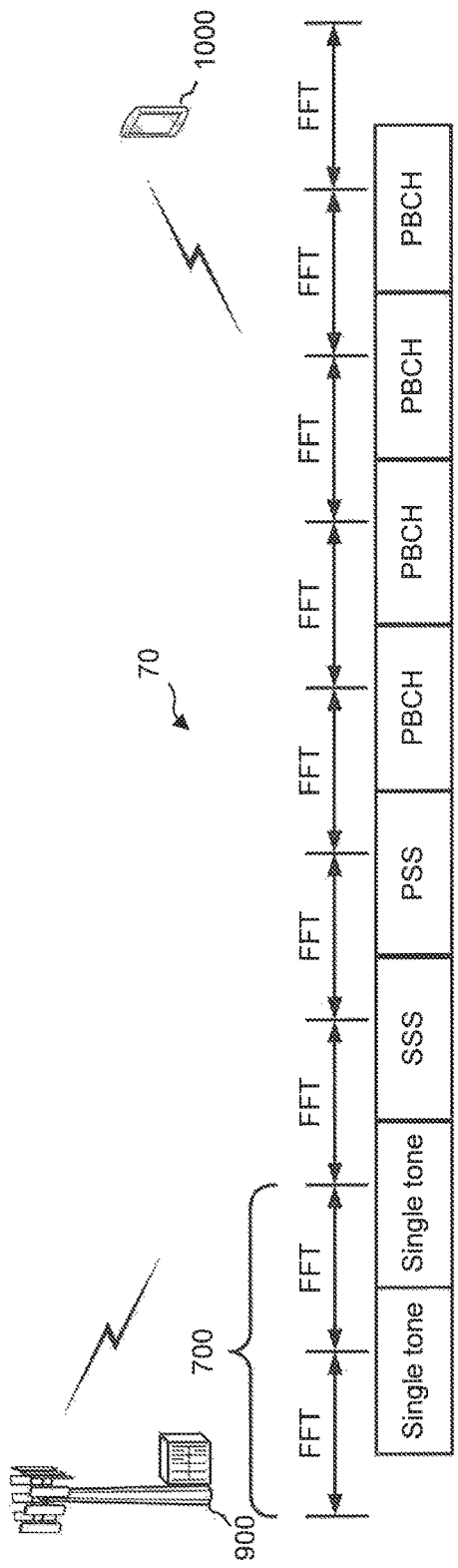
FIGS. 7A and 7B are block diagrams illustrating example transmission stream between an eNB and UE, each configured according to one aspect of the present disclosure.
Figure 7B:
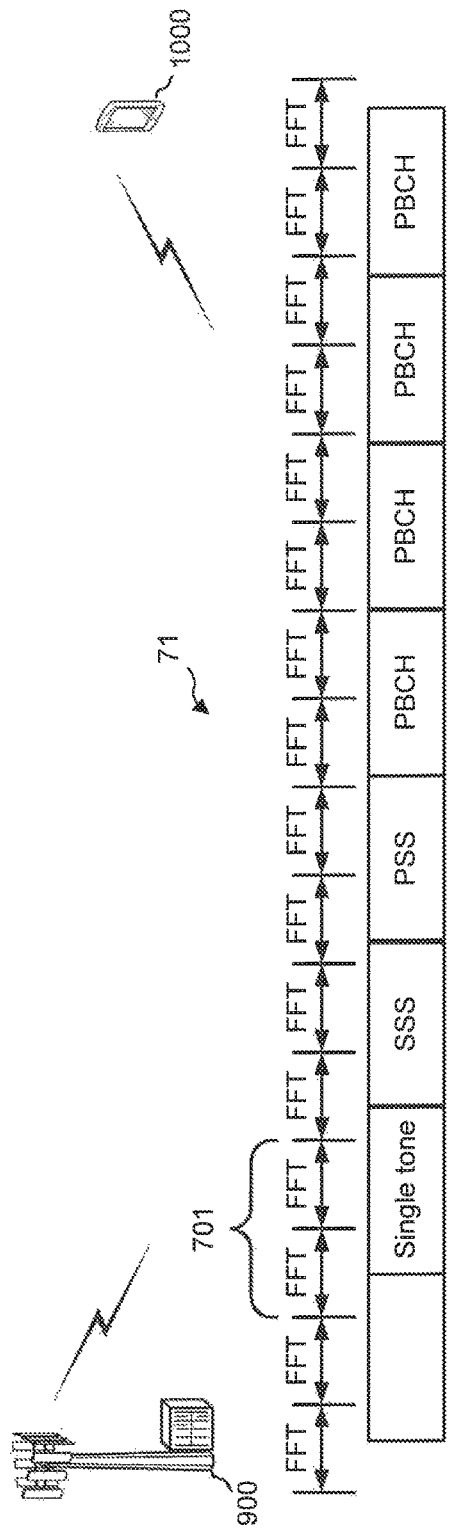

FIGS. 7A and 7B are block diagrams illustrating example transmission stream 70 and 71 between eNB 900 and UE 1000, each configured according to one aspect of the present disclosure. Transmission stream 70 illustrates a single tone preamble transmitted by eNB 900 over two symbols. eNB 900 may then transmit SSS, PSS, and further physical broadcast channel (PBCH) transmissions. With the tone preamble transmitted over two symbols, UE 1000 sets the window for FFT transformation of sample signals to half of the tone length. Accordingly, within one of the FFT windows over period 700, UE 1000 may transform the signal samples incorporating the tone preamble. UE 1000 may then determine the frequency error by comparing the frequency of the detected tone preamble against the known frequency and use the frequency error to phase ramp the sample taken after period 700 for PSS/SSS detection.

As illustrated in FIG. 7B, eNB 900 transmits the tone preamble over a single symbol of transmission stream 71. Because of the shorter tone length, UE 1000 sets the FFT transform window to half of the shorter tone length. Accordingly, within one of the FFT windows over period 701, UE 100 may transform the signal samples incorporating the tone preamble. UE 1000, again, determines the frequency error as compared against the known transmission frequency and uses the frequency error to phase ramp the following samples for PSS/SSS detection. However, with the shorter tone length, the residual frequency error may be up to ±15 KHz. which is above the capability of PSS/SSS detection, typically limited to a range of ±8 KHz. Accordingly, the PSS/SSS detection will be performed by phase ramping the samples twice, resulting in a form of bin analysis of the samples. For example, if the frequency error estimated is f, then there will be phase ramping at f+7.5 KHz and again at f−7.5 KHz, respectively, with PSS/SSS detection run for each phase ramping. As such, where ever the true frequency error is within the ±15 KHz, it may be captured in analysis of one of the phase ramped bins.

In one example implementation of the aspects illustrated in FIGS. 7A and 7B, eNB 900 transmits a single tone preamble at 240 KHz. UE 1000 performs FFT for each of its antenna and computes the energy or power for each tone. UE 1000 will then add the energy or power vectors together and find the maximum power tone. If the maximum power tone is outside of the 40 KHz~440 KHz range, UE 1000 would declare the single tone not detected and set a detection metric to 0. If the maximum power tone falls within the 40 KHz~440 KHz range, UE 1000 computes the detection metric as ratio of the power of the single tone over the total power across all tones (the ratio will be from 0 to 1). If this detection metric falls below a threshold, UE 1000 would again declare the single tone not detected and set the detection metric to 0. Otherwise, if ratio of the detection metric meets the threshold, UE 1000 declares the single tone detected and calculates the frequency error as the distance between the center frequency of the maximum power tone and the 240 KHz.

It should be noted that the location of 240 KHz for transmission of a tone preamble is merely one example of a frequency for transmission. The various aspects of the present disclosure may use other frequency locations that under the maximum allowed frequency error (±200 KHz for 5 GHz center frequency and ±20 ppm LO), it is still well away from the DC tone and within the search path low pass filter bandwidth.

Figure 8:
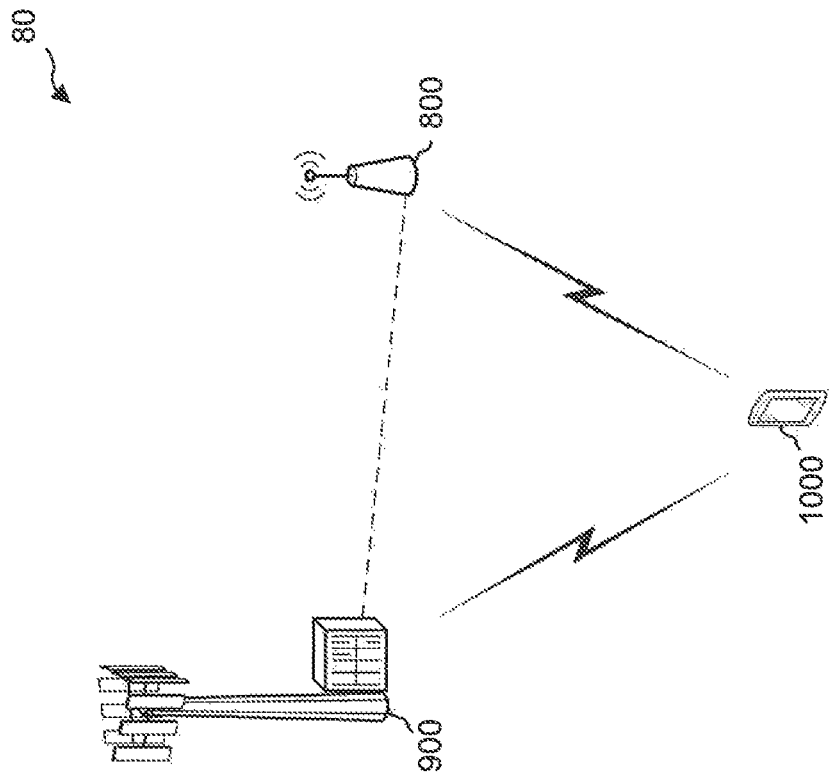
FIG. 8 is a block diagram illustrating eNBs and a UE configured according to one aspect of the preset disclosure.

FIG. 8 is a block diagram illustrating eNBs 800 and 900 and UE 1000 configured according to one aspect of the preset disclosure. eNBs 800 and 900 provide communications with UE 1000 either individually or via carrier aggregation or other such coordinated communications. When coordinating communications, eNBs 800 and 900 may communicate with each other via a backhaul link. When two eNBs, such as eNBs 800 and 900, each transmit tone preambles, a UE, such as UE 1000 may detect multiple peaks during the successive transforms. UE 1000 detects the peaks using the techniques as described above. UE 1000 may then launch PSS/SSS searcher branches for each peak. UE 1000 determines a frequency error associated with each of eNB 800 and 900 and uses each frequency error estimation to offset detection for the associated PSS/SSS transmissions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C) or any combinations thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    collecting a set of samples from a received transmission waveform;
    successively transforming the set of samples to a frequency domain resulting in a transformed set of samples;
    detecting one or more tones having at least a threshold power relative to other samples in the transformed set of samples;
    comparing a frequency of the one or more tones to a predetermined transmission frequency; and
    setting a frequency error to a difference between the frequency and the predetermined transmission frequency for processing one or more synchronization signals, wherein the detecting the one or more tones includes:
        determining that the one or more tones fall within a predetermined frequency range, wherein the predetermined frequency range is calculated based on frequency of the one or more tones and a maximum frequency error; and
        calculating a power metric as a ratio of a first power of the one or more tones over a total power across all tones of the predetermined frequency range, wherein the setting the frequency error is performed in response to the power metric meeting a predetermined threshold, wherein the predetermined frequency range within which the one or more tones falls does not include a direct current (DC) tone.

2. The method of claim 1, further including:
    phase ramping the set of samples after the detecting the one or more tones according to the frequency error; and
    detecting the one or more synchronization signals within the phase ramped set of samples.

3. The method of claim 1, wherein the one or more tones includes a single tone.

4. The method of claim 1, wherein the predetermined transmission frequency is a frequency at which the one or more tones is expected from a base station.

5. The method of claim 1, wherein the setting the frequency error includes averaging two or more frequency errors.

6. An apparatus configured for wireless communication, the apparatus comprising:
    at least one processor; and
    a memory coupled to the at least one processor,
    wherein the at least one processor is configured:
        to collect a set of samples from a received transmission waveform;
        to successively transform the set of samples to a frequency domain resulting in a transformed set of samples;
        to detect one or more, tones having at least a threshold power relative to other samples in the transformed set of samples;
        to compare a frequency of the one or more tones to a predetermined transmission frequency; and
        to set a frequency error to a difference between the frequency and the predetermined transmission frequency for processing one or more synchronization signals, wherein the configuration of the at least one processor to detect the one or more tones includes configuration of the at least one processor:
            to determine that the one or more tones falls within a predetermined frequency range, wherein the predetermined frequency range is calculated based on frequency of the one or more tones and a maximum frequency error; and
            to calculate a power metric as a ratio of a first power of the one or more tones over a total power across all tones of the predetermined frequency range, wherein the configuration of the at least one processor to set the frequency error is executed in response to the power metric meeting a predetermined threshold, wherein the predetermined frequency range within which the one or more tones falls does not include a direct current (DC) tone.

7. The apparatus of claim 6, including configuration of the at least one processor:
    to phase ramp the set of samples after the detection the one or more tones according to the frequency error; and
    to detect the one or more synchronization signals within the phase ramped set of samples.

8. The apparatus of claim 6, wherein the one or more tones includes a single tone.

9. The apparatus of claim 6, wherein the predetermined transmission frequency is a frequency at which the one or more tones is expected from a base station.

10. The apparatus of claim 6, wherein the configuration of the at least one processor to set the frequency error includes configuration of the at least one processor to average two or more frequency errors.

* * * * *